(12) United States Patent
Rainisto (10) Patent No.: US 9,082,227 B2
(45) Date of Patent: Jul. 14, 2015

(54) METHOD AND APPARATUS FOR A LINEAR REPRESENTATION OF AN IMAGE HISTOGRAM

(71) Applicant: Nokia Corporation, Espoo (FI)

(72) Inventor: Roope Aleksi Rainisto, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 82 days.

(21) Appl. No.: 13/923,027

(22) Filed: Jun. 20, 2013

(65) Prior Publication Data

US 2014/0375649 A1    Dec. 25, 2014

(51) Int. Cl.
*G06K 9/00* (2006.01)
*G06T 11/20* (2006.01)
*H04N 1/407* (2006.01)
*G06T 5/40* (2006.01)

(52) U.S. Cl.
CPC .................. *G06T 11/206* (2013.01); *G06T 5/40* (2013.01); *H04N 1/4074* (2013.01)

(58) Field of Classification Search
CPC ....... G06T 5/40; G06T 11/206; H04N 1/4074
USPC .......................................... 382/168; 345/440
See application file for complete search history.

(56) References Cited

U.S. PATENT DOCUMENTS

| | | | | |
|---|---|---|---|---|
| 6,236,751 B1 * | 5/2001 | Farrell | ............... | 382/168 |
| 7,006,688 B2 * | 2/2006 | Zaklika et al. | ............... | 382/165 |
| 7,319,787 B2 * | 1/2008 | Trifonov et al. | ............... | 382/168 |
| 7,630,547 B2 * | 12/2009 | Shiohara | ............... | 382/168 |
| 2009/0167672 A1 | 7/2009 | Kerofsky | | |

OTHER PUBLICATIONS

Nakashima, Shota, et al., "A Method for Extraction of Arbitrary Figure Using One-Dimensional Histogram," IEEE International Conference on Control, Automation and Systems, Oct. 14-17, 2008, Seoul, Korea, pp. 2782-2786.

La Consigna, 1D Histogram on OpenCV, http://laconsigna.wordpress.com/2011/04/29/1d-histogram-on-opencv/, Apr. 29, 2011, 7 pages.

* cited by examiner

*Primary Examiner* — Kanjibhai Patel
(74) *Attorney, Agent, or Firm* — McClure and Associates, PLLC (57) ABSTRACT

A method comprising determining an image histogram associated with an image, determining a linear image histogram based, at least in part, on the image histogram, and causing display of a linear representation of the image histogram and, at least part of, the image is disclosed.

20 Claims, 5 Drawing Sheets

METHOD AND APPARATUS FOR A LINEAR REPRESENTATION OF AN IMAGE HISTOGRAM

TECHNICAL FIELD

The present application relates generally to a linear representation of an image histogram.

BACKGROUND

As electronic apparatuses have expanded their capabilities, as well as the number and types of operations they perform, interaction has become increasingly complex. For example, the apparatus may display a plethora of information for the user to perceive. In some circumstances, a user may have difficulty understanding all of the information being presented to the user. In such circumstances, the user may desire to avoid misunderstanding the information and avoid relate errors, confusion, or delay. Under such circumstances, it may be desirable for a user to be able to perceive displayed information in a simple, quick, and intuitive manner.

SUMMARY

Various aspects of examples of the invention are set out in the claims.

One or more embodiments may provide an apparatus, a computer readable medium, a non-transitory computer readable medium, a computer program product, and a method for determining an image histogram associated with an image, determining a linear representation of the image histogram based, at least in part, on the image histogram, and causing display of the linear representation of the image histogram and, at least part of, the image.

One or more embodiments may provide an apparatus, a computer readable medium, a computer program product, and a non-transitory computer readable medium having means for determining an image histogram associated with an image, means for determining a linear representation of the image histogram based, at least in part, on the image histogram, and means for causing display of the linear representation of the image histogram and, at least part of, the image.

In at least one example embodiment, determination of the linear representation of the image histogram comprises selecting at least one value from a position in the image histogram, and representing the value as a representative color at a position in the linear representation of the image histogram such that the position in the image histogram correlates with the position in the image histogram.

In at least one example embodiment, a dimension of the linear representation of the image histogram at a position on the representation of the image histogram is independent of a value of the image histogram that correlates to the position.

In at least one example embodiment, such dimension is perpendicular to a span dimension of the linear representation of the image histogram.

In at least one example embodiment, the representative color relates to a grayscale color pallet.

In at least one example embodiment, representing the value as a representative color comprises performing a mathematical calculation based on the value to generate a numerical representation of the representative color.

In at least one example embodiment, representing the value as a representative color comprises determining that the value correlates to a table entry that designates the representative color.

In at least one example embodiment, the linear representation of the image histogram relates to an array of values such that a position in the array relates to an image brightness level and the value at a position of the array identifies a representative color to indicate a frequency of which the image brightness level indicated by the position occurs in the image.

In at least one example embodiment, causing display of the image and the linear representation of the image histogram is performed such that a central part of the image is unobscured by the linear representation of the image histogram.

In at least one example embodiment, the linear representation of the image histogram is positioned proximate to an edge of the image.

In at least one example embodiment, the linear representation of the image histogram overlays a part the image.

In at least one example embodiment, the part of the image relates to less than three percent of a length of a dimension of the image that is perpendicular to a span dimension of the linear representation of the image histogram.

In at least one example embodiment, the entirety of the image is unobscured by the linear representation of the image histogram.

In at least one example embodiment, the linear representation of the image histogram is positioned adjacent to the image.

One or more example embodiments further perform determining the linear representation of the image histogram such that a span of the linear representation of the image histogram corresponds with a dimension of the image.

In at least one example embodiment, the linear representation of the image histogram is positioned proximate to an edge of the image that corresponds with the span of the linear representation of the image histogram.

In at least one example embodiment, the image encompasses at least one dimension of the display, and the linear representation of the image histogram spans the dimension of the display.

In at least one example embodiment, the linear representation of the image histogram comprises a rectangle, which comprises a span dimension and a thickness dimension, such that different positions along a span dimension of the rectangle correspond to different positions in the image histogram.

In at least one example embodiment, different positions along the thickness dimension relate to the same position of the linear representation of the image histogram.

In at least one example embodiment, visual information at each position on the span dimension is identical along the thickness dimension.

One or more example embodiments further perform entering an image capture mode, wherein the image is associated with the image capture mode, and causation of display of the linear representation of the image histogram and, at least part of, the image is performed in the image capture mode.

In at least one example embodiment, the image relates to an image captured by way of the image capture mode.

In at least one example embodiment, the image relates to a viewfinder image.

In at least one example embodiment, the viewfinder image relates to an image indicative of visual information that may be captured by way of the image capture mode.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

An embodiment of the invention and its potential advantages are understood by referring to FIGS. 1 through 7 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

Figure 1:
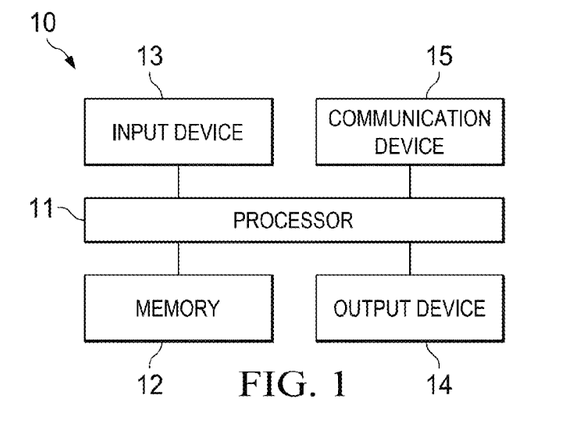
FIG. 1 is a block diagram showing an apparatus according to an example embodiment.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
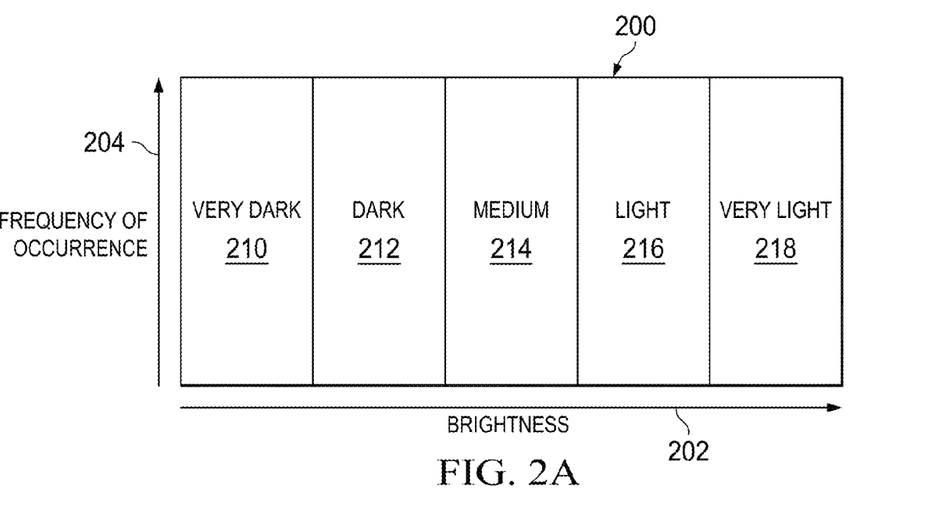
FIGS. 2A-2C are diagrams illustrating an image histogram according to at least one example embodiment.
Figure 2B:
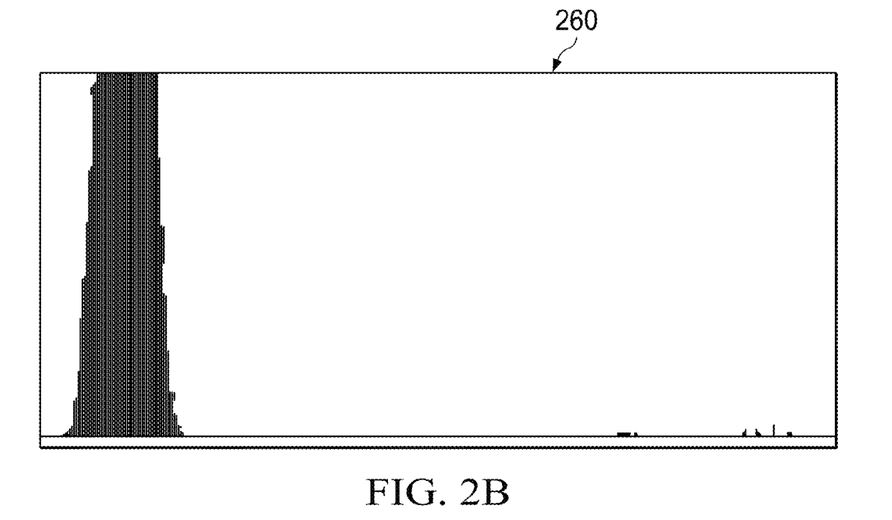
Figure 2C:
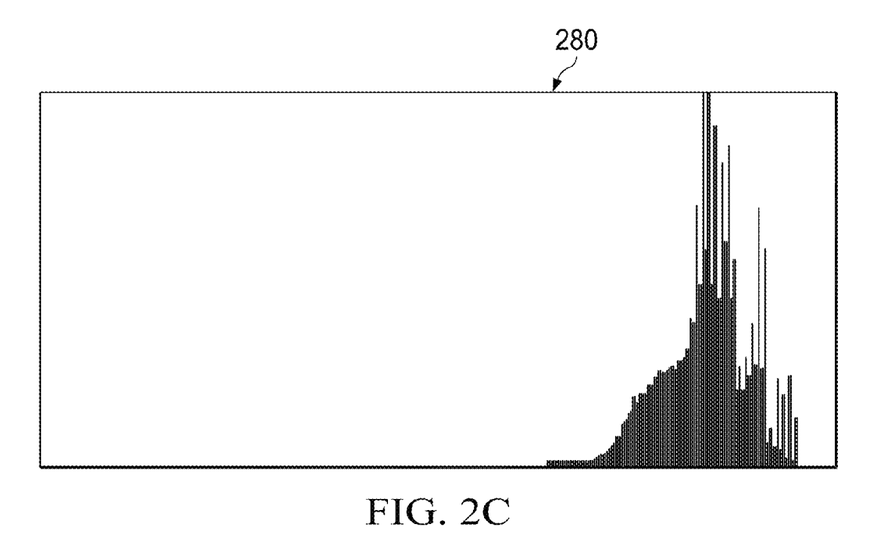

FIGS. 2A-2C are diagrams illustrating an image histogram according to at least one example embodiment. The examples of FIGS. 2A-2C are merely examples and do not limit the scope of the claims. For example, one or more dimensions of the image histogram may vary, resolution of the image histogram may vary, and/or the like.

Many users have become accustomed to using their electronic apparatuses for capturing images. For example, many electronic apparatuses, such as cameras, mobile phones, personal digital assistants, laptops, tablets, game consoles, etc., comprise a camera module that may be utilized for capturing images. In many circumstances, it may be desirable for the user to evaluate the quality of images on the electronic apparatuses. For example, the user may desire to understand the brightness level associated with an image. For example, an image that is too bright may appear washed out, such that details of the image may be difficult to perceive. In another example, an image that is too dark may appear under-exposed, such that details of the image may be difficult to perceive.

In some circumstances, a user may desire to utilize an image histogram to evaluate the brightness levels of an image. In at least one example embodiment, a histogram relates to a graph that indicates frequency of occurrences of a particular item. For example, an image histogram may indicate frequency of occurrences of different brightness levels. In at least one example embodiment, an image histogram relates to a two dimensional graph such that brightness level are arranged at positions along the x-axis, and values indicating how frequently a brightness level occurs in an image is represented on the y-axis. In at least one example embodiment, an image histogram is associated with an image by way of the histogram identifying values indicative of frequency of occurrence of different brightness levels of the image.

FIG. 2A is a diagram illustrating arrangement of an image histogram according to at least one example embodiment. It can be seen that the x-axis of the histogram is arranged such that increasing positions along the x-axis are associated with increasing levels of image brightness. In this manner, the x-axis is indicated by brightness 202. It can be seen that greater values along the y-axis are indicative of a higher frequency of occurrence of an image brightness level. In this manner, the y-axis is indicated by frequency of occurrence 204. In the example of FIG. 2A, it can be seen that brightness 202 is segmented into sections that indicate ranges of image brightness levels. For example, the segments indicating image brightness levels may include very dark segment 210, dark segment 212, medium segment 214, light segment 216, and very light segment 218. In at least one example embodiment, a medium segment relates to a set of image brightness levels that includes a medium image brightness level. In at least one example embodiment, the medium image brightness level relates to exposure at a midpoint of the camera module's dynamic range. In at least one example embodiment, a medium image brightness level relates to an eighteen percent gray. For example, medium segment 214 may include an image brightness level that is indicative of the midpoint of the camera module's dynamic range. In this manner a value at a particular position in the image histogram identifies the frequency of which the image brightness level indicated by the position occurs in the image.

In some circumstances, the image histogram may clip values above a predetermined maximum. For example, the image histogram may represent values that are greater than the predetermined maximum as being equal to the predetermined maximum.

In at least one example embodiment, the image histogram indicates a value by way of height of a rectangle at a position that corresponds with the image brightness level associated with the value. For example, a value indicative of 120 occurrences of a particular image brightness level may be represented in the image histogram as a rectangle at a position on the image histogram that corresponds with the particular brightness level, and has a height that corresponds with the value of 120. In at least one example embodiment, the width of the rectangle may be such that the rectangle is centered at the position and the edges of the rectangle correspond with a midpoint between the position and an adjacent position.

FIG. 2B is a diagram illustrating a dark image histogram according to at least one example embodiment. It can be seen that the positions of image histogram 260 that correspond to very dark image brightness levels represent high values. In this manner, the image may have a large proportion of very dark regions.

FIG. 2C is a diagram illustrating a light image histogram according to at least one example embodiment. It can be seen that the positions of image histogram 280 that correspond to light image brightness levels and very light image brightness levels represent high values. In this manner, the image may have a large proportion of light and very light regions.

It should be understood that, even though the image histogram is represented by a graph that occupies a rectangular region, the height of distance of a position of the representation of the image histogram at a position on the image histogram is dependent upon the value associated with the position. For example, it can be seen that the height of the representation image histogram varies along varying positions of the representation of the image histogram to indicate the value associated with each position. In this manner, the height of the representation of the image histogram may be distinct from the height of the region provided for display of the representation of the image histogram.

Figure 3A:
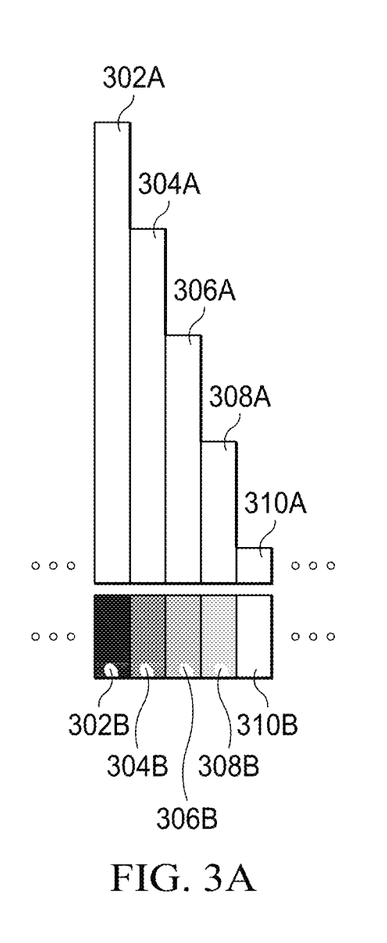
FIGS. 3A-3C are diagrams illustrating a linear representation of the image histogram according to at least one example embodiment.
Figure 3B:
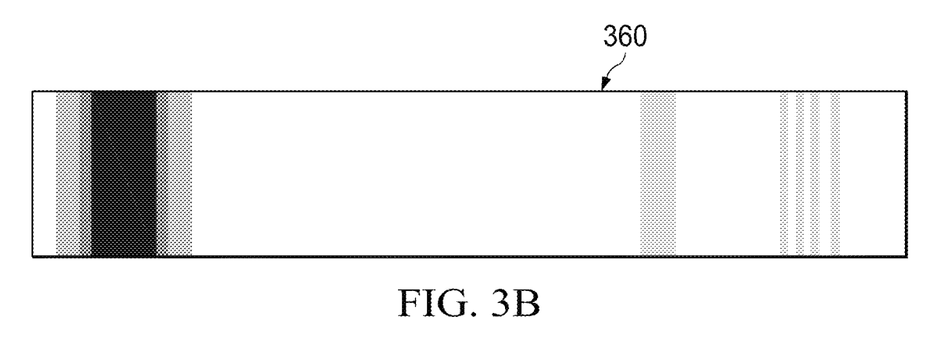
Figure 3C:
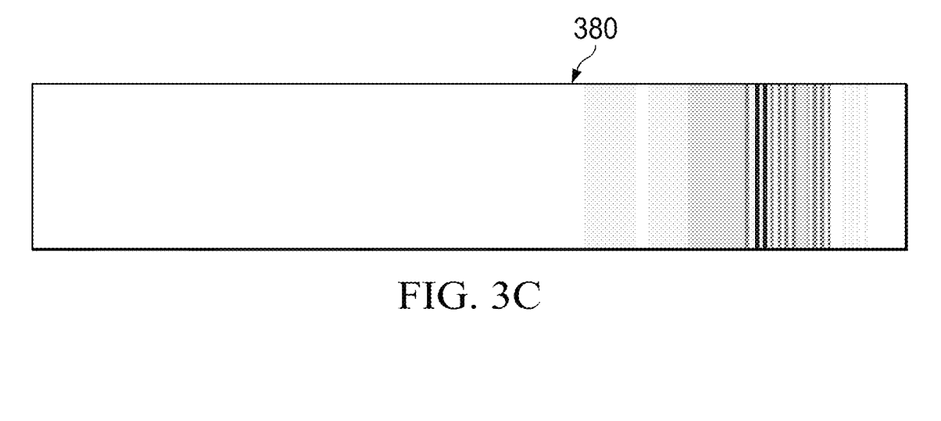

FIGS. 3A-3C are diagrams illustrating a linear representation of the image histogram according to at least one example embodiment. The examples of FIGS. 3A-3C are merely examples and do not limit the scope of the claims. For example, color palate may vary, differentiation among values may vary, resolution may vary, proportion of one or more dimensions may vary, and/or the like.

It can be seen in the examples of FIGS. 2B-2C that the image histogram may be easier for a user to understand when the y-axis is taller than when the y-axis is shorter. For example, it may be easier for a user to identify differences in values across different positions along the image histogram when the y-axis provides more space in which to represent the different values. However, in some circumstances, it may be desirable to avoid utilizing a large amount of space on a display for the y-axis of the image histogram. For example, it may be desirable to display the image histogram and the associated image at the same time on the same display. In such circumstances, it may be desirable to cause the image to be displayed in a manner in which the image histogram does not interfere with viewing of the image. For example, it may be desirable to cause the image to be displayed as large as possible on the display. In such an example, it may be desirable to reduce the amount of display area that is associated with the image histogram. For example, if the image histogram is displayed as an overlay on the image, similar as illustrated regarding FIG. 4A, it may be desirable to reduce the amount of the image that may be obscured by the image histogram. In another example, it may be desirable to minimize reduction of the size of the image that may be associated with displaying the image histogram in a manner that does not overlay the image. For example, if the image is displayed adjacent to the image histogram, it may be desirable for the image size to be as large as possible. However, it may also be desirable to avoid difficulty in interpreting the y-axis of the image histogram by having the y-axis be a tall as possible. In this manner, the desirability of a large image may compete with the desirability of an easy-to-interpret image histogram. Therefore, it may be desirable to provide for an image histogram that is less impacted by a reduction in the height of the area in which the image histogram is displayed.

In at least one example embodiment, the apparatus determines a linear representation of the image histogram. The linear representation of the image histogram may relate to a histogram that indicates values along different positions of the linear representation of the image histogram by way of a representative color. For example, the representative color may be a color that indicates a value, a range of values, and/or the like. In this manner, the user may be able to understand the different values of the histogram by identifying the color. In many circumstances, the amount of display area associated with displaying a color in a region large enough for the user to be able to perceive the color may be substantially less than the amount of display area associated with displaying a rectangle tall enough for a user to differentiate values based on height of the rectangle. For example, it may be easier for a user to identify a color of a rectangle having a one millimeter height than for the user to distinguish differences in heights that vary between zero and one millimeter. In at least one example embodiment, a dimension of the linear representation of the image histogram at a position on the representation of the image histogram is independent of a value of the image histogram that correlates to the position. In at least one example embodiment, such dimension is perpendicular to a span dimension of the linear representation of the image histogram. For example, if the span of the representation of the image histogram is horizontal, the height of the representation of the image histogram at a position may be independent of the value of the image histogram at a correlating position. In this manner, a distance associated with the indication of a value on the linear representation of the image histogram may be independent of the value. In at least one example embodiment, the apparatus may allocate a common height to display each color along the linear representation of the image histogram.

In at least one example embodiment, the linear representation of the image histogram relates to an array of values such that a position in the array relates to an image brightness level. In such an example, the value at a position of the array may identify a representative color to indicate a frequency of which the image brightness level indicated by the position occurs in the image. The representative color may indicate different values by way of having different brightness, different tint, different hue, and/or the like. For example, a first representative color may indicate a high value and a second representative color may indicate a low value. In such an example, values between the highest representable value and the lowest representable value may indicate value by way of the amount of the first representative color and the second representative color in the representative color associated with the value. For example, a value that is closer to the value indicated by the first representative color may have a larger component of the first representative color than the second representative color. In at least one example embodiment, the representative color relates to a grayscale color pallet. For example, white may indicate a high value and black may indicate a low value. In such an example a darker color may indicate a lesser value than a lighter color. In another example, white may indicate a low value and black may indicate a high value. In such an example a darker color may indicate a greater value than a lighter color.

FIG. 3A is a diagram illustrating a linear representation of the image histogram in relation to an image histogram according to at least one example embodiment. The example of FIG. 3A indicates a part of an image histogram in relation to an equivalent part of a liner image histogram. In the example of FIG. 3A, image histogram segment 302A indicates the same value as indicated by linear representation of the image histogram segment 302B, image histogram segment 304A indicates the same value as indicated by linear representation of the image histogram segment 304B, image histogram segment 306A indicates the same value as indicated by linear representation of the image histogram segment 306B, image histogram segment 308A indicates the same value as indicated by linear representation of the image histogram segment 308B, and image histogram segment 310A indicates the same value as indicated by linear representation of the image histogram segment 310B. It can be seen that the value indicated by image histogram segment 302A may be greater than the value indicated by histogram segment 304A, that the value indicated by image histogram segment 304A may be greater than the value indicated by histogram segment 306A, that the value indicated by image histogram segment 306A may be greater than the value indicated by histogram segment 308A, and that the value indicated by image histogram segment 308A may be greater than the value indicated by histogram segment 310A. Similarly, it can be seen that in the example of FIG. 3A, the value indicated by image histogram segment 302B may be greater than the value indicated by histogram segment 304B, that the value indicated by image histogram segment 304B may be greater than the value indicated by histogram segment 306B, that the value indicated by image histogram segment 306B may be greater than the value indicated by histogram segment 308B, and that the value indicated by image histogram segment 308B may be greater than the value indicated by histogram segment 310B. In this manner, the linear representation of the image histogram may indicate greater values by darker colors and lesser values by lighter colors.

In at least one example embodiment, an apparatus causes display of a linear representation of the image histogram. In at least one example embodiment, the linear representation of the image histogram comprises a rectangle. The rectangle may comprise the linear representation of the image histogram similar as described regarding FIGS. 3B and 3C. In at least one example embodiment, the rectangle comprises a span dimension and a thickness dimension. In at least one example embodiment, the span dimension relates to a dimension of the rectangle along which different positions along the span dimension of the rectangle correspond to different positions in the image histogram. In at least one example embodiment, different positions along the thickness dimension relate to the same position of the image histogram. For example, visual information at each position on the span dimension may be identical along the thickness dimension. In this manner, the thickness dimension of the linear representation of the image histogram may be perpendicular to the span dimension of the linear representation of the image histogram.

FIG. 3B is a diagram illustrating a representation of a linear representation of the image histogram according to at least one example embodiment. In the example of FIG. 3B, darker colors relate to greater values and lighter colors relate to lesser values. In at least one example embodiment, linear representation of the image histogram 360 correlates with image histogram 260 of FIG. 2B. For example, the dark region to the left part of linear representation of the image histogram 360 may correspond with the high region of image histogram 260, and the light regions of linear representation of the image histogram 360 may correspond with the low regions of image histogram 260.

FIG. 3C is a diagram illustrating a representation of a linear representation of the image histogram according to at least one example embodiment. In the example of FIG. 3C, darker colors relate to greater values and lighter colors relate to lesser values. In at least one example embodiment, linear representation of the image histogram 380 correlates with image histogram 280 of FIG. 2C. For example, the dark regions to the right part of linear representation of the image histogram 380 may correspond with the high regions of image histogram 280, and the light regions of linear representation of the image histogram 380 may correspond with the low regions of image histogram 280.

In at least one example embodiment, an apparatus determines a linear representation of the image histogram based, at least in part, on the image histogram. For example, the apparatus may evaluate a position of the image histogram to determine a color for the correlating position of the linear representation of the image histogram. For example, the apparatus may select at least one value from a position in the image histogram, and represent the value as a representative color at a position in the linear representation of the image histogram such that the position in the image histogram correlates with the position in the linear representation of the image histogram.

In at least one example embodiment, representing the value as a representative color comprises performing a mathematical calculation based on the value to generate a numerical representation of the representative color. For example, the brightness of the color may be associated with a numeric value. For example, a grayscale pallet may represent black as a zero value and white as the greatest value available in a particular resolution. For example, with 8-bit resolution, the greatest value may be 255, and with 16 bit resolution, the greatest value may be 16,635. For example, the apparatus may determine the brightness of the color by way of the following equation:

$$C_{pos} = V_{pos}(B_{max} - B_{min}) + B_{min}$$

where pos relates to a correlating position of the image histogram and the linear representation of the image histogram, $C_{pos}$ relates to the color at position pos of the linear representation of the image histogram, $V_{pos}$ relates to the value at position pos of the image histogram, $B_{min}$ relates to the minimum brightness level of the image histogram, and relates to the maximum brightness level of the image histogram.

In at least one example embodiment, representing the value as a representative color comprises determining that the value correlates to a table entry that designates the representative color. For example, there may be a table that correlates a color associated with a value or range of values. In such an example, the apparatus may determine the representative color to be color of the table correlates to the value.

In some circumstances, the user may be more concerned with the pattern indicated by the linear representation of the image histogram than with the precision of color indication at each position along the span of the linear representation of the image histogram. For example, the user may desire to see trends in high values, trends in low values, and/or the like, along the span of the linear representation of the image histogram. In such circumstances, the user may desire to view a smooth progression between representative colors instead of discrete color transitions between adjacent positions on the linear representation of the image histogram. In at least one example embodiment, the apparatus determines the linear representation of the image histogram such that a maximum color deviation threshold is preserved between representative colors of adjacent positions of the linear representation of the image histogram. For example, the apparatus may utilize a maximum deviation color threshold to smooth color transitions into a pattern that may not necessarily include each precise value along the image histogram, but may represent a low-pass filtered version of the image histogram such that large deviation of values between adjacent positions on the image histogram are indicated as representative color transitions with less deviation between adjacent positions. In this manner, the apparatus may filter the image histogram to generate a liner representation of the image histogram that avoids representative color transitions that exceed a maximum color deviation threshold.

Figure 4A:
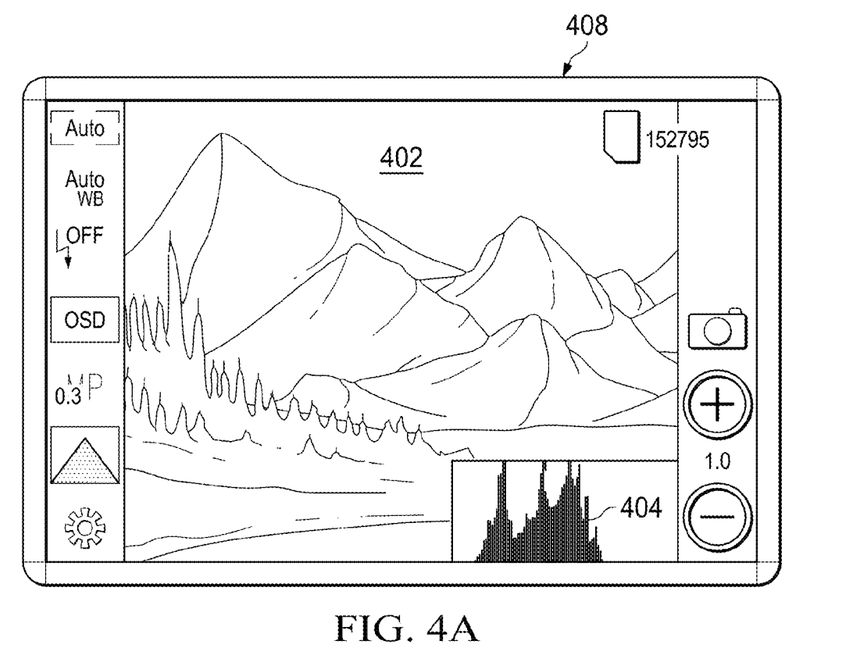
FIGS. 4A-4B are diagrams illustrating representations of image histograms according to at least one example embodiment.
Figure 4B:
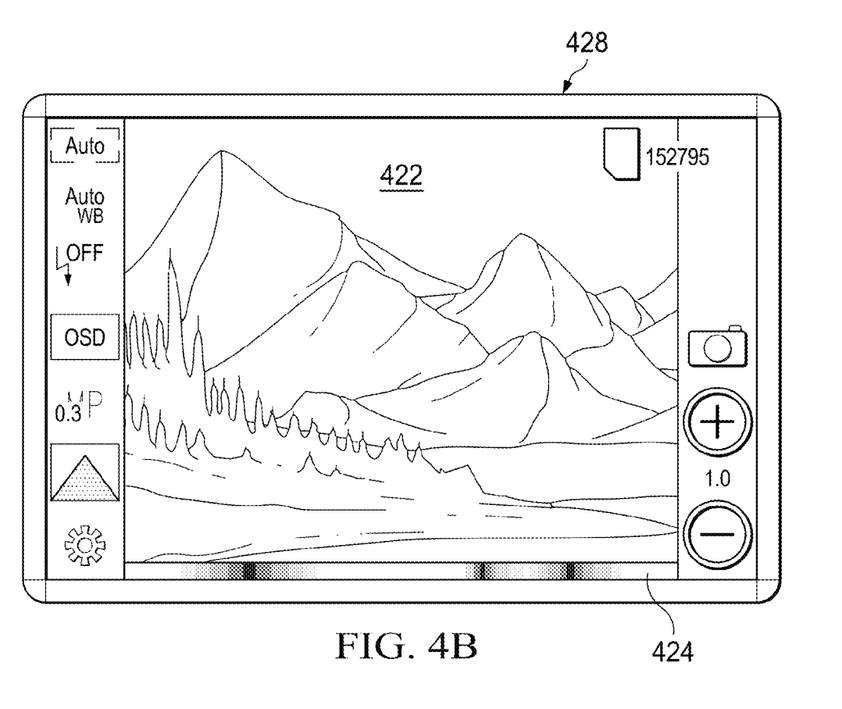

FIGS. 4A-4B are diagrams illustrating representations of image histograms according to at least one example embodiment. The examples of FIGS. 4A-4B are merely examples and do not limit the scope of the claims. For example, orientation of the representation of the image histogram may vary, relationship between the image and the representation of the image histogram may vary, and/or the like.

As previously described, in some circumstances, it may be desirable to display, at least part of, an image and a representation of an associated image histogram on the same display at the same time.

FIG. 4A is a diagram illustrating a representation of an image histogram according to at least one example embodiment. It can be seen in FIG. 4A that image 402 is being displayed with representation of image histogram 404. In the example of FIG. 4A, representation of image histogram 404 is presented as an overlay on image 402. For example, at least part of representation of image histogram 404 is transparent such that, at least part of, image 402 may be perceived through, at least part of, representation of image histogram 404. In this manner, representation of image histogram 404 occludes, at least part of, image 402. It can be seen that the occlusion of image 402 extends significantly towards the center of image 402. For example, it can be seen that the upper left corner of representation of image histogram 404 is proximate to the center of image 402.

As previously described, it may be desirable to avoid occlusion of, at least a central part, the image. In at least one example embodiment, the apparatus causes display of, at least a part of the image, and a linear representation of the image histogram. In at least one example embodiment, causing display of the image and the linear representation of the image histogram is performed such that a central part of the image is unobscured by the linear representation of the image histogram. For example, the linear representation of the image histogram may be positioned proximate to an edge of the image. In such an example, the linear representation of the image histogram may overlay a part the image such that the thickness dimension of the linear representation of the image histogram extends towards the center of the image. In this manner, the thickness dimension of the linear representation of the image histogram may be scaled to reduce obscurance of the center of the image. For example, the thickness dimension of the linear representation of the image histogram may be scaled to be less than three percent of a length of a dimension of the image that is perpendicular to a span dimension of the linear representation of the image histogram. In such an example, if the linear representation of the image histogram is at the right of the image, the thickness dimension of the representation of the linear may extend leftward towards the center of the image to a distance that is less than three percent of the width of the image.

In at least one example embodiment, the entirety of the image is unobscured by the linear representation of the image histogram. For example, the linear representation of the image histogram may be positioned adjacent to the image. For example, the image may be scaled to allow display space for the linear representation of the image histogram. In another example, there may be a display area that is available by way of a difference between the aspect ratio of the image and the display. In such an example, the aspect ratio of the display may be taller than the aspect ratio of the image. In such an example, the linear representation of the image histogram may be displayed above or below the image.

In at least one example embodiment, the apparatus may determine the linear representation of the image histogram such that a span of the linear representation of the image histogram corresponds with a dimension of the image. For example, the span of the linear representation of the image histogram may be equal to the height of the image as displayed, equal to the width of the image as displayed, and/or the like. In such an example, the linear representation of the image histogram may be positioned proximate to an edge of the image that corresponds with the span of the linear representation of the image histogram. For example, if the span of the linear representation of the image histogram corresponds to the height of the image as displayed, the linear representation of the image histogram may be positioned proximate to the left side or the right side of the image. In another example, if the span of the linear representation of the image histogram corresponds to the width of the image as displayed, the linear representation of the image histogram may be positioned proximate to the top or the bottom of the image. In at least one example embodiment, the image encompasses at least one dimension of the display, and the linear representation of the image histogram spans the dimension of the display. For example, the image may encompass a horizontal dimension of the display. In such an example, the linear representation of the image histogram may span the horizontal dimension. In another example, the image may encompass a vertical dimension of the display. In such an example, the linear representation of the image histogram may span the horizontal dimension of the display.

FIG. 4B is a diagram illustrating a linear representation of the image histogram according to at least one example embodiment. It can be seen that linear representation of the image histogram 424 is placed at the bottom edge of image 422. It can be seen that the span of linear representation of the image histogram 424 is equal to the width of image 422 as displayed in the example of FIG. 4B. It can be seen that the center of image 422 is unobscured by linear representation of the image histogram 424.

In at least one example embodiment, the apparatus may be in an image capture mode. In at least one example embodiment, an image capture mode relates to an interaction mode that allows a user to view and interact with visual information associated with capturing an image and/or video. The interaction mode may allow the user to view and interact with visual information by way of a user interface, a control module, and/or the like.

In at least one example embodiment, the user interface provides visual information associated with capturing the image, such as a representation of visual information received by a camera module, For example, camera module 13B. The visual information may be similar to the icons shown to the sides of image 402 of FIG. 4A, and to the sides of image 422 of FIG. 4B. The user interface may further provide visual information associated with visual information received by a camera module. For example, image 402 of FIG. 4A and/or image 422 of FIG. 4B may be a representation of visual information received from a camera, such as an image captured by the camera module. In such an example, such an image may be referred to as an image captured in the image capture mode. In at least one example embodiment, an image capture mode comprises a viewfinder. In at least one example embodiment, the viewfinder provides a region of the display that may indicate viewfinder information. In at least one example, embodiment, viewfinder information relates to the visual information of the capture mode that includes visual information received by a camera module. In this manner, a viewfinder image may relate to an image indicative of visual information that may be captured by way of the image capture mode. For example, the visual information may be captured upon user input indicative of image capture actuation. Such viewfinder information may be a representation of visual information that is being continuously updated by a camera module to allow the user to prepare for an image capture operation. For example, image 422 of FIG. 4B may relate to a viewfinder image. In at least one example embodiment, the apparatus provides a linear representation of the image histogram associated with a viewfinder image. In this manner, the viewfinder may comprise the viewfinder image. In at least one example embodiment, the viewfinder may comprise information associated with the image. For example, the viewfinder may comprise a representation of a liner image histogram.

In at least one example embodiment, the user may perform an input that causes the apparatus to transition between display of a non-linear representation of the image histogram and a linear representation of the image histogram. For example, the user may be able to transition from the example of FIG. 4A to the example of FIG. 4B, transition from the example of FIG. 4B to the example of FIG. 4A, and/or the like.

Figure 5:
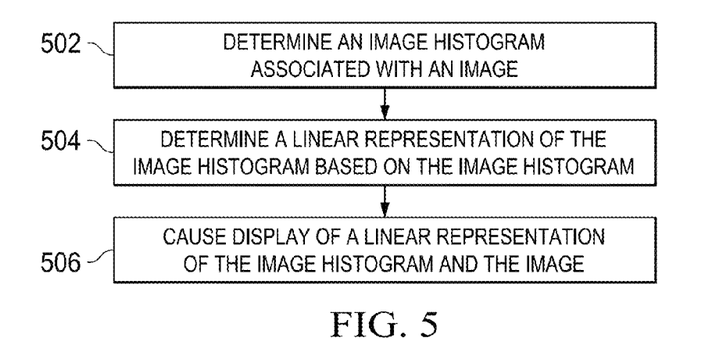
FIG. 5 is a flow diagram illustrating activities associated with a linear representation of the image histogram according to at least one example embodiment.

FIG. 5 is a flow diagram illustrating activities associated with a linear representation of the image histogram according to at least one example embodiment. In at least one example embodiment, there is a set of operations that corresponds the activities of FIG. 5. An apparatus, For example, electronic apparatus 10 of FIG. 1, or a portion thereof, may utilize the set of operations. The apparatus may comprise means, including, For example, processor 11 of FIG. 1, for performance of such operations. In an example embodiment, an apparatus, For example, electronic apparatus 10 of FIG. 1, is transformed by having memory, For example, memory 12 of FIG. 1, comprising computer code configured to, working with a processor, For example, processor 11 of FIG. 1, cause the apparatus to perform set of operations of FIG. 5.

At block 502, the apparatus determines an image histogram associated with an image. The determination, the image histogram, and the image may be similar as described regarding FIGS. 2A-2C, FIGS. 4A-4B, and/or the like.

At block 504, the apparatus determines a linear representation of the image histogram based, at least in part, on the image histogram. The determination and the linear representation of the image histogram may be similar as described regarding FIGS. 3A-3C.

At block 506, the apparatus causes display of a linear representation of the image histogram and, at least part of, the image. The causation of display and the linear representation of the image histogram may be similar as described regarding FIGS. 4A-4B.

Figure 6:
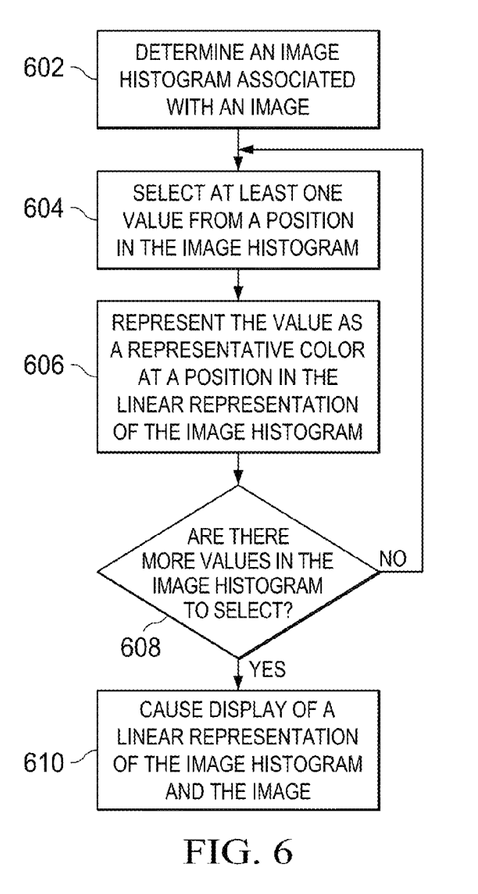
FIG. 6 is a flow diagram illustrating activities associated with a linear representation of the image histogram according to at least one example embodiment.

FIG. 6 is a flow diagram illustrating activities associated with a linear representation of the image histogram according to at least one example embodiment. In at least one example embodiment, there is a set of operations that corresponds the activities of FIG. 6. An apparatus, For example, electronic apparatus 10 of FIG. 1, or a portion thereof, may utilize the set of operations. The apparatus may comprise means, including, For example, processor 11 of FIG. 1, for performance of such operations. In an example embodiment, an apparatus, For example, electronic apparatus 10 of FIG. 1, is transformed by having memory, For example, memory 12 of FIG. 1, comprising computer code configured to, working with a processor, For example, processor 11 of FIG. 1, cause the apparatus to perform set of operations of FIG. 6.

At block 602, the apparatus determines an image histogram associated with an image, similar as described regarding block 502 of FIG. 5.

At block 604, the apparatus selects at least one value from a position in the image histogram. The selection, the value, and the position may be similar as described regarding FIGS. 3A-3C.

At block 606, the apparatus represents the value as a representative color at a position in the linear representation of the image histogram such that the position in the image histogram correlates with the position in the linear representation of the image histogram. The representative color, the position in the linear representation of the image histogram, the position in the image histogram, and the correlation may be similar as described regarding FIGS. 3A-3C.

At block 608, the apparatus determines whether there are more values in the image histogram to select. If the apparatus determines that there are more values in the image histogram to select, flow returns to block 604. If the apparatus determines that each of the values in the image histogram has been selected, flow proceeds to block 610.

At block 610, the apparatus cause display of a linear representation of the image histogram and, at least part of, the image, similar as described regarding block 506 of FIG. 5.

Figure 7:
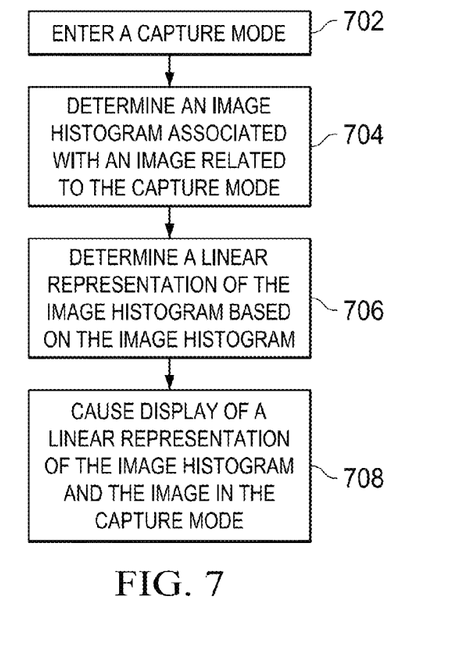
FIG. 7 is a flow diagram illustrating activities associated with a linear representation of the image histogram according to at least one example embodiment.

FIG. 7 is a flow diagram illustrating activities associated with a linear representation of the image histogram according to at least one example embodiment. In at least one example embodiment, there is a set of operations that corresponds the activities of FIG. 7. An apparatus, For example, electronic apparatus 10 of FIG. 1, or a portion thereof, may utilize the set of operations. The apparatus may comprise means, including, For example, processor 11 of FIG. 1, for performance of such operations. In an example embodiment, an apparatus, For example, electronic apparatus 10 of FIG. 1, is transformed by having memory, For example, memory 12 of FIG. 1, comprising computer code configured to, working with a processor, For example, processor 11 of FIG. 1, cause the apparatus to perform set of operations of FIG. 7.

At block 702, the apparatus enters a capture mode. The capture mode may be similar as described regarding FIGS. 4A-4B. At block 704, the apparatus determines an image histogram associated with an image related to the capture mode. The determination, the image histogram, the image, and the relation to the capture mode may be similar as described regarding FIGS. 2A-2C, FIGS. 4A-4B, and/or the like.

At block 706, the apparatus determines a linear representation of the image histogram based, at least in part, on the image histogram, similarly as described regarding block 504 of FIG. 5. At block 708, the apparatus causes display of a linear representation of the image histogram and, at least part of, the image in the capture mode. The causation of display and the linear representation of the image histogram may be similar as described regarding FIGS. 4A-4B.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   determine an image histogram associated with an image;
   determine a linear representation of the image histogram based, at least in part, on the image histogram such that values that correspond to positions of the image histogram are represented at corresponding positions along a span dimension of the linear representation of the image histogram, and such that a dimension of the linear representation of the image histogram at a position on the representation of the image histogram is independent of a value of the image histogram that correlates to the position, the dimension being perpendicular to a span dimension of the linear representation of the image histogram; and
   cause display of the linear representation of the image histogram and, at least part of, the image.

2. The apparatus of claim 1, wherein determination of the linear representation of the image histogram comprises:
   selecting at least one value from a position in the image histogram; and
   representing the value as a representative color at a position in the linear representation of the image histogram such that the position in the image histogram correlates with the position in the linear representation of the image histogram.

3. The apparatus of claim 2, wherein the representative color relates to a grayscale color pallet.

4. The apparatus of claim 1, wherein the image relates to a viewfinder image and causation of display of the image histogram and the image relates to causation of display in a viewfinder.

5. The apparatus of claim 1, wherein the memory further includes computer program code, the memory and the computer program code configured to, working with the processor, cause the apparatus to determine the linear representation of the image histogram such that the span of the linear representation of the image histogram corresponds with a dimension of the image.

6. The apparatus of claim 1, wherein the image encompasses at least one dimension of the display, and the linear representation of the image histogram spans the dimension of the display.

7. The apparatus of claim 1, wherein the linear representation of the image histogram relates to an array of values such that a position in the array relates to an image brightness level and the value at a position of the array identifies a representative color to indicate a frequency of which the image brightness level indicated by the position occurs in the image.

8. The apparatus of claim 1, wherein visual information at each position on the span dimension is identical along the thickness dimension.

9. The apparatus of claim 1, wherein the apparatus comprises a display.

10. A method comprising:
    determining an image histogram associated with an image;
    determining a linear representation of the image histogram based, at least in part, on the image histogram such that values that correspond to positions of the image histogram are represented at corresponding positions along a span dimension of the linear representation of the image histogram, and such that a dimension of the linear representation of the image histogram at a position on the representation of the image histogram is independent of a value of the image histogram that correlates to the position, the dimension being perpendicular to a span dimension of the linear representation of the image histogram; and
    causing display of the linear representation of the image histogram and, at least part of, the image.

11. The method of claim 10, wherein determination of the linear representation of the image histogram comprises:
    selecting at least one value from a position in the image histogram; and
    representing the value as a representative color at a position in the linear representation of the image histogram such that the position in the image histogram correlates with the position in the linear representation of the image histogram.

12. The method of claim 11, wherein the representative color relates to a grayscale color pallet.

13. The method of claim 10, wherein the image relates to a viewfinder image and causation of display of the image histogram and the image relates to causation of display in a viewfinder.

14. The method of claim 10, further comprising determining the linear representation of the image histogram such that a span of the linear representation of the image histogram corresponds with a dimension of the image.

15. The method of claim 10, wherein the image encompasses at least one dimension of the display, and the linear representation of the image histogram spans the dimension of the display.

16. The method of claim 10, wherein the linear representation of the image histogram comprises a rectangle, which comprises a span dimension and a thickness dimension, such that different positions along a span dimension of the rectangle correspond to different positions in the linear image histogram.

17. At least one non-transitory computer-readable medium encoded with instructions that, when executed by a processor, perform:
    determining an image histogram associated with an image;
    determining a linear representation of the image histogram based, at least in part, on the image histogram such that values that correspond to positions of the image histogram are represented at corresponding positions along a span dimension of the linear representation of the image histogram, and such that a dimension of the linear representation of the image histogram at a position on the representation of the image histogram is independent of a value of the image histogram that correlates to the position, the dimension being perpendicular to a span dimension of the linear representation of the image histogram; and
    causing display of the linear representation of the image histogram and, at least part of, the image.

18. The medium of claim 17, wherein determination of the linear representation of the image histogram comprises:
    selecting at least one value from a position in the image histogram; and
    representing the value as a representative color at a position in the linear representation of the image histogram such that the position in the image histogram correlates with the position in the linear representation of the image histogram.

19. The medium of claim 18, wherein the representative color relates to a grayscale color pallet.

20. The medium of claim 17, wherein the image relates to a viewfinder image and causation of display of the image histogram and the image relates to causation of display in a viewfinder.

* * * * *